US006195985B1

(12) United States Patent
del Re et al.

(10) Patent No.: US 6,195,985 B1
(45) Date of Patent: Mar. 6, 2001

(54) METHOD FOR REDUCING THE POLLUTANT EMISSION OF AN INTERNAL COMBUSTION ENGINE

(75) Inventors: Luigi del Re, Solothurn; Robert Apter; Daniel Handschin, both of Biel, all of (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 09/174,547

(22) Filed: Oct. 19, 1998

(30) Foreign Application Priority Data

Oct. 31, 1997 (EP) .................................................. 97119038

(51) Int. Cl.$^7$ ....................................................... F01N 3/00
(52) U.S. Cl. ................................ 60/274; 60/285; 60/307; 123/DIG. 11
(58) Field of Search .............................. 60/274, 286, 295, 60/307, 698, 716, 304; 123/198 DB, 198 DC, DIG. 11

(56) References Cited

U.S. PATENT DOCUMENTS

| 3,158,144 | * | 11/1964 | Walker ........................... 123/198 DC |
| 3,338,111 | * | 8/1967 | Walker ........................... 123/198 DC |
| 3,771,921 | * | 11/1973 | Rohde et al. ............................ 60/307 |
| 3,867,919 | * | 2/1975 | Grenier et al. .................... 123/198 D |
| 5,323,868 | | 6/1994 | Kawashima ........................ 180/65.4 |
| 5,524,434 | * | 6/1996 | Ma .......................................... 60/307 |
| 5,566,774 | * | 10/1996 | Yoshida .................................. 60/300 |
| 5,875,864 | * | 3/1999 | Yano et al. ..................... 123/198 DB |

FOREIGN PATENT DOCUMENTS

| 37 23 703 A1 | 1/1989 | (DE) . |
| 40 29 672 A1 | 4/1992 | (DE) . |
| 40 29 672 C2 | 9/1992 | (DE) . |
| 41 41 946 A1 | 6/1993 | (DE) . |
| 43 38 740 C1 | 1/1995 | (DE) . |
| 0 561 311 B1 | 3/1993 | (EP) . |

OTHER PUBLICATIONS

Database WPI, Section PQ, Week 9737, Derwent Publications Ltd., London, GB; Class Q13, AN 97–396778 XP002058824 & JP 09 068 065 A (Nissan Motor Co.Ltd) Mar. 11, 1997, Abstract.

* cited by examiner

Primary Examiner—Jeanette Chapman
Assistant Examiner—Sneh Varma
(74) Attorney, Agent, or Firm—Griffin & Szipl, P.C.

(57) ABSTRACT

The method according to the invention is based on the discovery that the pollutant emissions in the first minutes of operation of an internal combustion engine also depend on the preceding operation and switching off procedure. It is suggested to subject the internal combustion engine and the catalytic converter to a cleaning or a scavenging phase before the standstill of the motor. With this cleaning or scavenging phase the movement of the internal combustion engine is still maintained for a certain time before standstill of the motor either by sparking or by an external drive and at least temporally in at least individual cylinders of the internal combustion engine the supply of fuel is interrupted and exclusively air is delivered. By way of this it is achieved that the remaining pollutants accumulated in the internal combustion engine are supplied to the catalytic converter which is still at the operating temperature and the catalytic converter is enriched with oxygen. For example one may let the internal combustion engine run out, by which means its rotational speed (n) from the beginning of the scavenging procedure ($t_1$) to the standstill of the motor ($t_2$) continuously decreases.

19 Claims, 3 Drawing Sheets

METHOD FOR REDUCING THE POLLUTANT EMISSION OF AN INTERNAL COMBUSTION ENGINE

BACKGROUND OF THE INVENTION

The invention relates to a method for reducing the pollutant emission of an internal combustion engine according to the introductory part of claim 1.

Various devices and methods for exhaust purification are already known.

EP-B-0 561 311 for example relates to an exhaust purification device comprising a zeolite-based adsorber for the short-time intermediate storage of pollutants, and a catalytic converter disposed downstream thereof for the conversion of the pollutant. In the exhaust tube section lying therebetween there opens a tube which is sufficiently distanced from the adsorber and which comes from a burner with its own fuel and air supply. By way of this arrangement it is made possible that on the one hand the gases produced by the burner heat the catalytic converter and bring it quickly to its operating temperature without compromising the zeolite adsorber, and that on the other hand thermic secondary reactions of exhaust components are achieved in the mentioned exhaust tube section, i.e. still before the entry into the converter.

According to DE-OS 41 41 946 it is suggested in a similar context to blow secondary air into the exhaust stream between the internal combustion engine and the catalytic converter. To this effect however an air pump is provided whose starting up is effected in a directed manner only for so long until the operating temperature of the catalytic converter is reached.

In addition with DE-OS 37 23 703 air is mixed in with the exhaust stream before entry into the catalytic converter. In contrast to the two above-mentioned solutions a separate gas or air delivery means is done away with in that the internal combustion engine itself forms the delivery means. To this effect it is provided for some of the cylinders not to be fired but to be applied as air pumps.

DE-PS 40 29 672 suggests the improvement of cutting off individual cylinders only for a short time, i.e. to let a short interruption follow several working strokes so that the temperature of the cylinders remains maintained. Generally it is also advantageous to cut off the ignition according to the interruption of the supply of the mixture.

The documents cited hereinabove relate to improvements in the starting procedure of an internal combustion engine, i.e. in particular of an Otto engine of a road vehicle. Indeed the pollutant emission during the starting of a vehicle is increasingly important, since on the one hand exhaust regulations are becoming more restrictive and on the other hand the pollutant emission during the normal operation is reduced thanks to more effective catalytic converters.

BRIEF SUMMARY OF THE INVENTION

Although a pollutant reduction on starting an internal combustion engine may well be achieved with these suggestions, it is the object of the present invention to provide a further improvement with respect to this.

The method according to the invention is based on the unexpected discovery that with respect to pollutant emissions in the first operating minutes of an internal combustion engine, in particular of an Otto motor, not only the starting procedure is of a significance but also the preceding switching off procedure.

For the purpose of as small a pollutant formation as possible, on starting up an internal combustion engine the method according to the invention not only provides for optimal conditions during the starting up procedure but also on switching off the internal combustion engine.

In contrast to an essentially uncontrolled manner of switching off an internal combustion engine with conventional road vehicles, it is suggested according to the present invention to subject the internal combustion engine and the catalytic converter to a cleaning or scavenging phase before the standstill of the motor. With this cleaning or scavenging phase as illustrated in flow chart of FIG. 6.

the movement of the internal combustion engine is still maintained for a certain time before standstill of the motor either by letting it run out, by sparking or by an external drive step (S1 in FIG. 6), and at least temporally in at least individual cylinders of the internal combustion engine the supply of fuel is interrupted and exclusively air is delivered (step S2 in FIG. 6).

By way of this it is achieved that the remaining pollutants accumulated in the internal combustion engine are supplied to the catalytic converter which is still at the operating temperature and that the catalytic converter is enriched with oxygen.

In other words with the method according to the invention the "old waste" from the preceding operation may be reduced for the subsequent warm or cold start.

During a usual, randomly effected switching off procedure of an internal combustion engine a substantial quantity of pollutants does not necessarily arise, but the pollutants accumulated from the last operation remain in the internal combustion engine, i.e. in the cavities of the internal combustion engine concerned, such as for example the intake duct, combustion duct, exit duct and/or the crankcase. With a subsequent cold start these pollutants pass the exhaust purification device which is not at operating temperature and thus is not capable of functioning well. This is also substantially the case when means for the accelerated starting up of the exhaust purification device are present, i.e. for example with additional, externally heatable catalytic converters, a prior-arranged burner, etc.

This disadvantage is alleviated by the solution according to the invention since a certain switching off procedure is provided with which the pollutants accumulated in the internal combustion engine are scavenged out and get into the exhaust purification device which is located at its operating temperature and is fully functioning.

Basically with an Otto motor three pollutant components are to be named: carbon monoxide, unburned hydrocarbons as well as nitrogen oxide, hereinafter also indicated as CO, HC and $NO_x$ respectively.

The carbon monoxide formation is first of all to be attributed to air or oxygen deficiency and thus may be influenced via the air-fuel ratio. Carbon monoxide may also arise with an excess of oxygen on account of local mixture inhomogeneities as well as the freezing of reactions in the wall vicinity.

Furthermore with large heat dissipations in the wall vicinity, a cooling arise so that the flame extinguishes (quench-effect), and in regions in which the flame may not get into, i.e. in the various gaps of the combustion space (piston rings, cylinder head gasket, piston ignition web, etc.) there arise unburned hydrocarbons such as aromatic compounds, olefins and paraffins. Since a cooling off in the wall vicinity leads to a HC formation, the percentage HC content of the exhaust is dependent on the surface area/ volume ratio of the combustion space, which means that the HC formation with motors of a lower piston-swept volume per cylinder is more significant. A further source for unburned hydrocarbons in the exhaust is formed by the releasing of the lubricating film and the subsequent transport into the exhaust duct, where only a part-oxidation takes place. Generally the HC emission may be effectively reduced with a lambda-control.

Nitrogen oxides in the combustion space arise particularly at high temperatures and with a slight excess of air. With extreme rich or thin mixtures on the other hand the temperatures for splitting up $N_2$ and $O_2$ are hardly reached. Amongst other things the $NO_x$ production may also be contained by way of a lambda-control.

Since the method according to the invention provides for the addition of a phase before switching off the internal combustion engine, with which on average more oxygen is added than with a stoichiometric operation, in particular the hydrocarbons and carbon monoxide accumulated in the internal combustion engine may be led to the catalytic converter which is still at its operating temperature and is operational. Furthermore in this manner, as mentioned, the oxygen reserve of the catalytic converter may be replenished so that with the next start procedure the oxidation of CO and HC molecules may be achieved more effectively. This preparatory measure is particularly advantageous for a subsequent cold start, since with this on account of the rich mixture and low combustion space temperatures, principally CO and HC's arise and the $NO_x$ production is slight. The reduction of $NO_x$ by the catalytic converter must generally be ensured only after the starting and warming up phase when the motor is heavily loaded and the combustion space temperature is correspondingly high.

The method according to the invention is particularly advantageous for Otto motors. Measurements confirm that with this method the CO and HC emissions during the start phase can be significantly reduced.

Since, as mentioned, the HC formation becomes more significant with a reducing piston-swept volume, the method according to the invention is particularly advantageous for motors with a small piston-swept volume. For example motors with a cylinder volume of less than 250 $cm^3$ are included, wherein as mentioned the invention likewise ensures a significant reduction of pollutants on starting for machines with larger volumes.

Although diesel motors produce significantly smaller CO and HC emission values than Otto motors, the method according to the invention may also be of an advantage for diesel or other internal combustion engines.

The method according to the invention is not only to be applied in a manner such that at the end of the cleaning procedure a pollutant-free as possible internal combustion engine is present, but also such that this procedure is effected in a manner which is low in pollutants and consumption per se.

This may be particularly ensured when the internal combustion engine is driven by a further machine during the cleaning procedure or during the pumping through of air and the internal combustion engine accordingly no longer needs to produce power for maintaining the rotational speed. A vehicle with a hybrid drive particularly lends itself to this, i.e. with an internal combustion engine on the one hand and an electric machine on the other hand. In particular a series hybrid vehicle is suitable for the application of the method according to the invention, since here the electric machine is in any case in direct driving connection with the internal combustion engine, is of high power and can be operated as a motor.

With a parallel hybrid vehicle similar advantages arise as with a conventional vehicle with a thermic drive, with which the starter is applied as a drive means. Preferably for this a starter of a larger power and life expectancy is provided. If the internal combustion engine is driven by an external drive means, then as a rule it is not important whether the internal combustion engine is loaded or not or if it obtains power from the crankshaft or not.

If however the application of a drive auxiliary means is not provided the method according to the invention may also be carried out given the supply of fuel, wherein for this, seen on average, the oxygen or air component is to be increased. A weak mixture would correspond to this condition but this would result in a larger HC production since the excess air has a cooling, flame-inhibiting effect. The method according to the invention or the average oxygen increase should however not give rise to a mixture or lambda change, but should be decoupled as much as possible from the mixture typical to the motor. This is made possible in that at least individual cylinders at least temporally, principally deliver air. The corresponding cylinders then operate as air pumps. By way of the fact that the pump activity is advantageously alternately divided amongst the cylinders, no cylinder suffers a massive reduction in temperature. A sufficiently large throughput of air is therefore at odds with an undisturbed as possible operation of the motor. A suitable optimum can be found by the man skilled in the art without further ado. For example with each cylinder several normal operation cycles may follow an air delivery cycle, wherein the air delivery cycles of the various cylinders are advantageously to be displaced from one another with respect to time. Here for example the document DE 40 29 672 may be referred to. As has been stated several times it is however decisive that this method is specifically effected before the standstill of the motor. In case that the internal combustion engine maintains its movement on its own without auxiliary drive means, i.e. maintains the rotation of its crankshaft, it is advantageous for a lower consumption, a lower additional pollutant production and a short-lasting cleaning phase not to load the internal combustion engine or to keep it free of loading. The operation during the scavenging phase is advantageously exclusively provided for the delivery of oxygen. Even when the method according to the invention is designed in a manner such that during the scavenging procedure, for the benefit of an internal combustion engine which is as free from pollutants as possible, additional pollutants arise, then the total quantity of pollutants expelled during the time period between the switching off command of the driver until again reaching the operating temperature of the internal combustion engine and of the exhaust purification device on a subsequent start may be smaller. However it is to be mentioned that the switching off procedure is not measured according to European exhaust standards. Although at present only start and normal operation are tested, the method according to the invention is to be designed in dependency on several parameters, such as the type of internal combustion engine, the type of the exhaust purification device, the temperature of the air suctioned by the internal combustion engine, etc., in such a manner that the total pollutant emission may be kept as low as possible. This means that the cleaning procedure of the internal combustion engine according to the invention should last as short a time as possible since otherwise the advantage of an excellent cleaning is lost to the disadvantage of a large additional consumption and pollutant emission.

Still assuming the case that no auxiliary drive means are provided the method according to the invention may however be carried out without the supply of fuel in that one lets the internal combustion engine run out as load free as possible. So that despite the missing drive a sufficiently long run-out time can be achieved, the braking torques are to be kept small. For example with low rotational speeds it may be useful for the purpose of reducing throttle losses to completely open the throttle in as far as it is present. Furthermore the braking torque may also be reduced by way of valve timing. The run out time may however also be extended with an increase in the flywheel mass of the combustion engine.

Moreover with the selection of the duration and the rotational speed course of the scavenging procedure, the noise emissions are to be taken into account. It is for example not possible during the scavenging procedure on account of the noise formation and also of the consumption to assume a high rotational speed. This is also not necessary since with lower rotational speeds CO and HC's may be evacuated from the internal combustion engine very efficiently and the catalytic converter may be supplied with oxygen.

However the most efficient evacuation of a certain type of pollutant generally takes place at a certain rotational speed. In dependency on the respective motor type, an optimal course of rotational speed may be found with which the internal combustion engine is largely freed of pollutants within the shortest period of time. Furthermore with some motors it has been ascertained that for example a cleaning of the crank housing requires more time than the cleaning of the intake, combustion and exit ducts. The course of rotational speed is thus defined by the accumulation location of the pollutants, the type of pollutant in each case, the noise formation, the additional energy requirement, etc. There follows further below, examples of courses of rotational speed.

According to the present invention the cleaning or the scavenging phase of the internal combustion engine may be effected by way of a gas containing oxygen. For this of course as mentioned, surrounding air is obvious.

In an obvious manner the cleaning or scavenging phase is to be initiated by a switching off command of the driver, which means as has been stated that the internal combustion engine remains further in operation or in motion for a certain time in some sort of defined manner.

The method according to the invention must however not compellingly be exclusively initiated by the switching off command of the driver but may also be introduced automatically on account of certain operating conditions without the driver doing anything. For example an almost load-free steady gas operation over a certain time may be provided as the initiation criterion for the cleaning or scavenging phase according to the invention. For this traffic light installations in particular on building sites are reminded of, since here the motor is often switched off only after a long wait. Such a situation may be recognised by a control or regulating means and the method according to the invention may be introduced as a provision so that the motor given any switching off command of the driver then comes to a standstill as soon as possible. In this context there are further examples which here are not quoted.

DETAILED DESCRIPTION OF THE INVENTION

All FIGS. 1 to 5 show rotational speed/time diagrams of various embodiments of the inventive method, wherein it only concerns examples and yet other rotational speed courses may be provided within the scope of the invention.

In all six figures it is assumed that at a point in time $t_1$ an initiation command is effected which as mentioned may proceed directly from the driver or by an electronic means. At this point in time $t_1$ the internal combustion engine comprises any rotational speed $n_1$. From $t_1$ the application of the method according to the invention begins wherein the rotational speed has a certain selected course until shortly before the standstill of the machine. Of course the rotation of the motor does not finish asymptotically before standstill but as shown in the figures, more or less suddenly.

Figure 1:
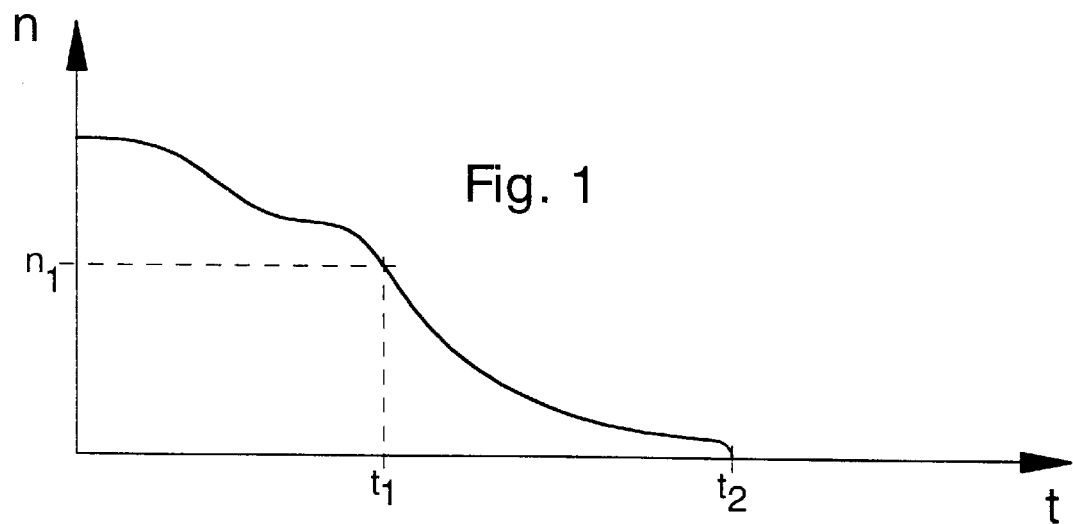
FIG. 1 is a diagram illustrating engine speed vs. time according to a first embodiment of the invention.

A first embodiment example of the method for cleaning an internal combustion engine for the next starting up thereof according to the invention is shown in FIG. 1. The course of the rotational speed sinks after $t_1$ until the standstill of the machine at a point in time $t_2$, roughly exponentially. This is the typical course for an internal combustion engine which is neither externally driven nor fired. One lets the internal combustion engine run out as load-free as possible.

Figure 2:
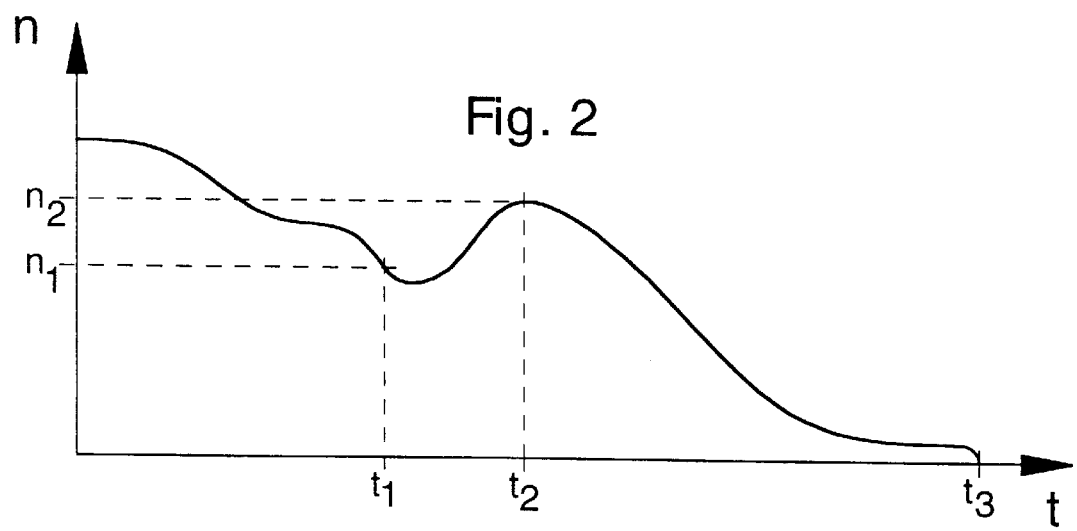
FIG. 2 is a diagram illustrating engine speed vs. time according to a second embodiment of the invention.

Should however this run-out time not be sufficient then it may be provided to firstly increase the rotational speed once again, as is shown in FIG. 2. In this manner a more thorough scavenging of the internal combustion engine and oxygen saturation of the catalytic converter may be achieved. With this the internal combustion engine firstly reaches the rotational speed $n_2$ at a point in time $t_2$ and subsequently reduces until a point in time $t_3$. The power required for increasing the rotational speed may be effected by the supply of fuel or by an external drive as has been mentioned several times previously.

Of course the curve shape of FIG. 1 may also be advantageously obtained by the addition of fuel or by an external drive with which for example an extension of the run-out time is achieved.

Figure 3:
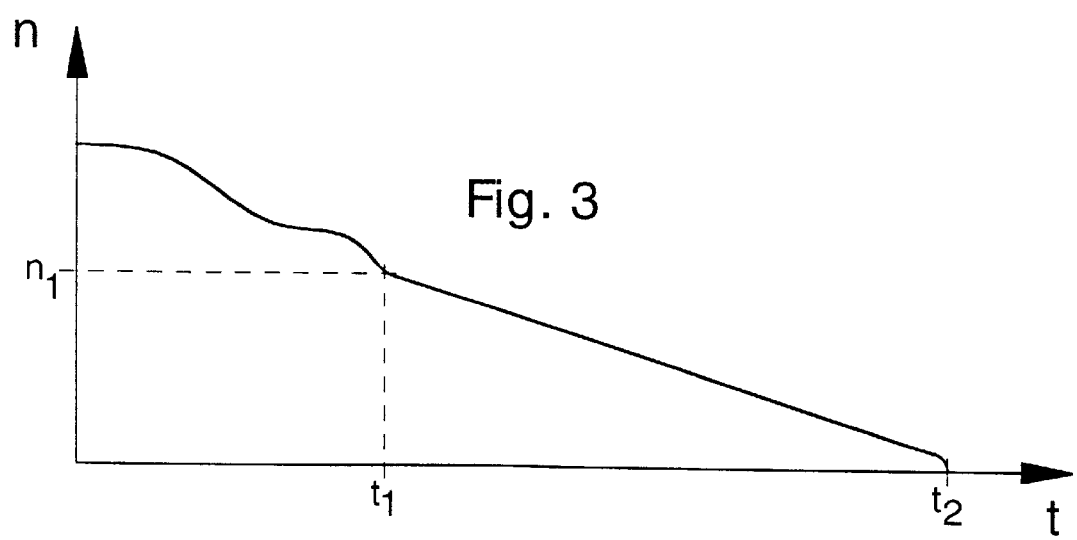
FIG. 3 is a diagram illustrating engine speed vs. time according to a third embodiment of the invention.

According to FIG. 3 the rotational speed reduces from $t_1$ until roughly at a point in time $t_2$ by letting the internal combustion engine run out. The curve shape may be controlled or regulated by the braking moment of the machine in that the throttle flap position is for example continuously changed as a function of the rotational speed.

Figure 4:
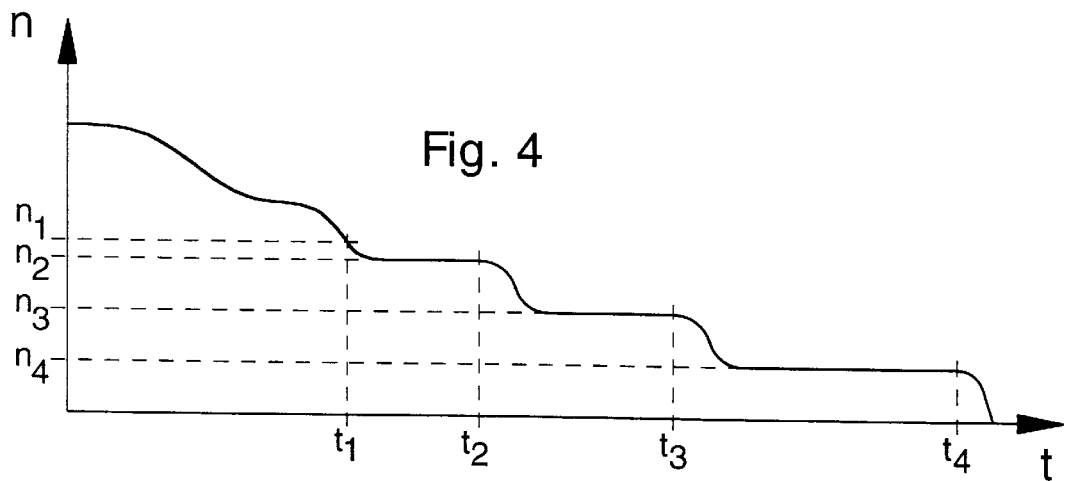
FIG. 4 is a diagram illustrating engine speed vs. time according to a fourth embodiment of the invention.

In FIG. 4 a step-shaped reduction of the rotational speed is represented. Firstly after the initiation signal at $t_1$ the rotational speed $n_2$ is set and kept for a certain time, then is further reduced after $t_2$ and is kept at a lower value of rotational speed $n_3$ until $t_3$ and is once again subsequently reduced from $t_3$ to a lower value of rotational speed $n_4$ which is maintained until a point in time $t_4$. With such an operation for example the desorption of certain pollutants or certain pollutant accumulation locations may be dealt with in a directed manner. With such a course of rotational speed however an energy expense for maintaining the rotational speed is necessary. The individual horizontal lines of the steps may however fall slightly.

Figure 5:
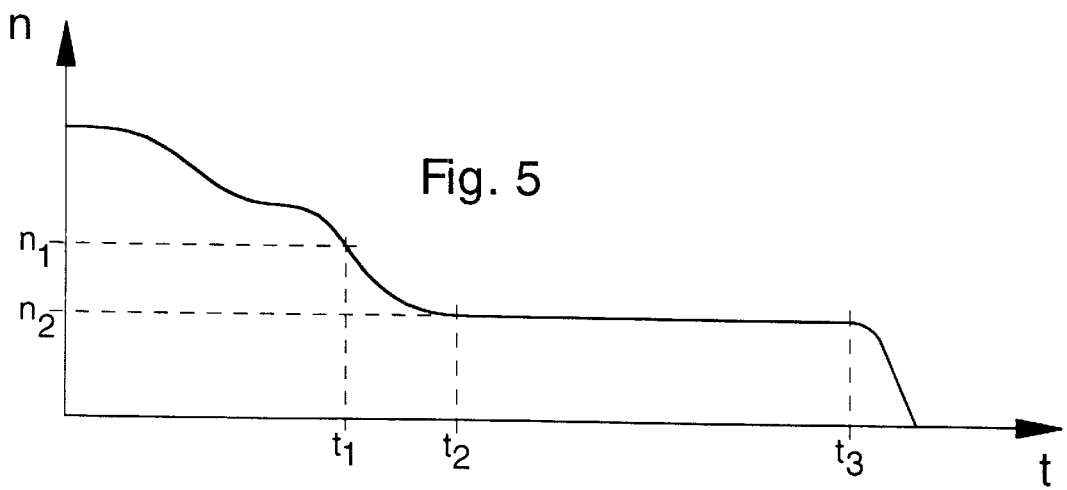
FIG. 5 is a diagram illustrating engine speed vs. time according to a fifth embodiment of the invention; and, FIG. 6 is a flow chart illustrating steps of a method according to the invention.
Figure 6:
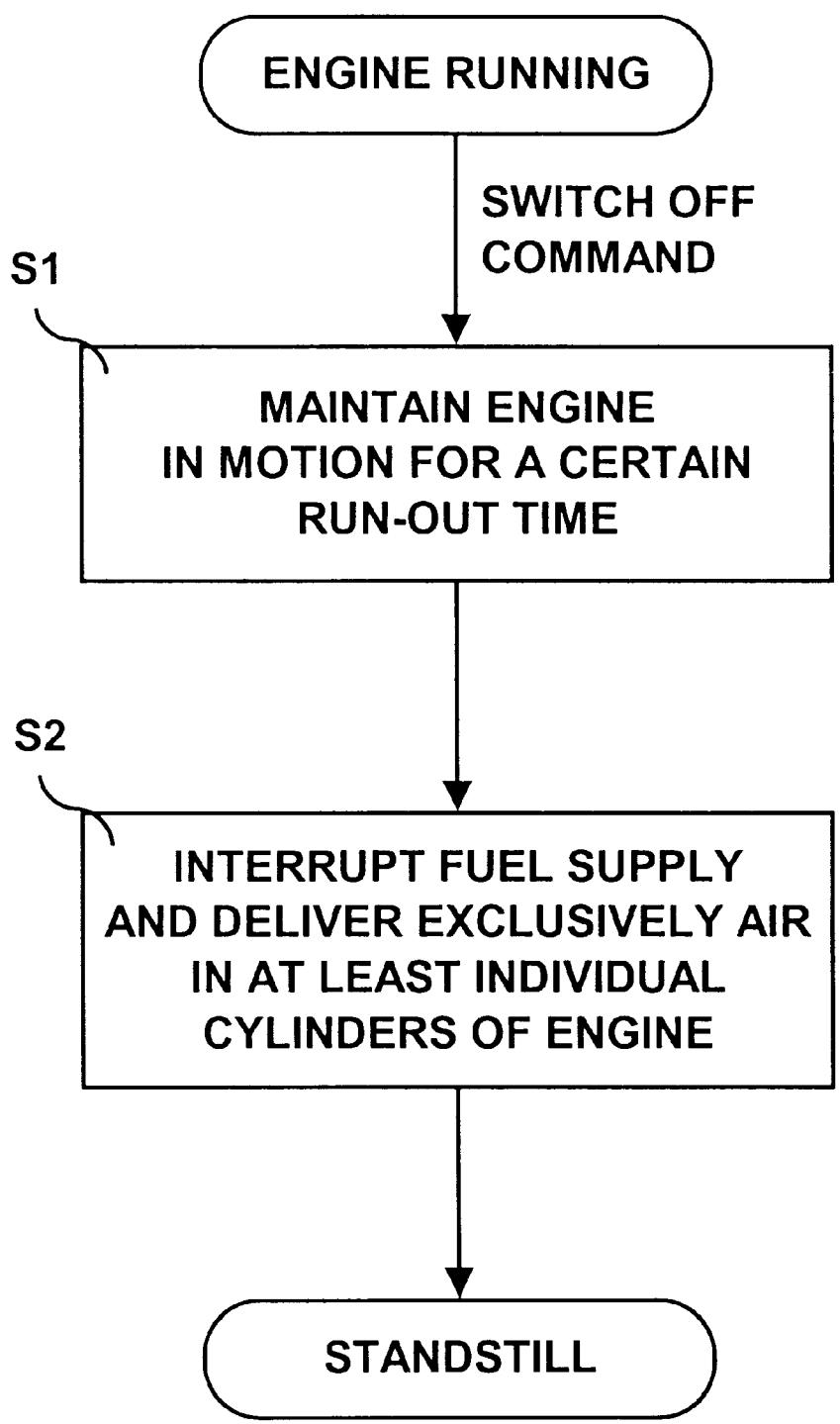

FIG. 5 shows a further typical case with which either external drive means maintain the rotational speed or the internal combustion engine is kept in operation. Firstly from $t_1$ a fixed rotational speed value $n_2$ is set. Then this value $n_2$ is kept essentially constant between $t_2$ and $t_3$.

As has been mentioned these are only a few examples which can be combined with one another. Furthermore yet further courses of rotational speed which are not shown here may be provided.

Although the method for reducing the pollutant emission of an internal combustion engine according to the invention relates to the switching off or the running down procedure of an internal combustion engine for the purpose of a large as possible reduction in pollutants, it is advantageous on the one hand to combine the method according to the invention with any exhaust purification devices, such as catalytic converters, intermediate storers, soot filters, etc., also with any starting methods as are deduced from the previously mentioned documents.

Furthermore a blower may of course also be applied for the supply of air.

The method according to the invention may of course also be provided for a rail-borne vehicle.

Furthermore the internal combustion engine need not relate to a vehicle. For example the method according to the invention may also be provided for a stationary installation such as for example a heating.

What is claimed is:

1. A method for reducing the pollutant emission of an internal combustion engine comprising a fuel supply and a catalytic converter wherein, before the internal combustion engine reaches a standstill, a cleaning procedure is executed wherein, the internal combustion engine is still maintained in motion for a certain run-out time before standstill, and at least temporally in at least individual cylinders of the internal combustion engine the supply of fuel is interrupted and exclusively air is delivered, so that the remaining pollutants accumulated in the internal combustion engine are supplied to the catalytic converter which is still at the operating temperature and the catalytic converter is enriched with oxygen.

2. A method according to claim 1, wherein the internal combustion engine is maintained in motion during said cleaning procedure by letting it run out until standstill.

3. A method according to claim 2, wherein the fuel supply of the internal combustion engine during the cleaning procedure is completely switched off.

4. A method according to claim 3, wherein a braking moment of the internal combustion engine is controlled as a function of its rotational speed.

5. A method according to claim 1, wherein the fuel supply of at least a few cylinders is switched off and only air is pumped through.

6. A method according to claim 5, wherein the remaining cylinders are operated with a slightly rich mixture.

7. A method according to claim 1, wherein the internal combustion engine during the cleaning procedure is driven by an electrical machine which can be operated as a motor.

8. A method according to claim 7, wherein the method is provided for a non rail-borne vehicle with a hybrid drive.

9. A method according to claim 8, wherein the method is provided for a series hybrid vehicle.

10. A method according to claim 1, wherein during said cleaning procedure, a rotational speed of the internal combustion engine is essentially kept at a constant value.

11. A method according to claim 1, wherein during said cleaning procedure, a rotational speed of the internal combustion engine continuously reduces.

12. A method according to claim 1, wherein during said cleaning procedure, a rotational speed of the internal combustion engine continuously reduces in a step-shaped manner.

13. A method according to claim 1, wherein a rotational speed of the internal combustion engine is firstly brought to a higher value before the cleaning procedure is carried out.

14. A method according to claim 1, wherein besides interrupting the supply of fuel in said at least individual cylinders, ignition is also switched off.

15. A method according to claim 1, wherein the cleaning procedure is initiated as a result of a switching off command of the vehicle driver.

16. A method according to claim 1, wherein the cleaning procedure is automatically initiated as a result of a command of an electronic device.

17. A method according to claim 1, wherein the run-out time is extended by increasing a flywheel mass of the internal combustion engine.

18. A method according to claim 1, wherein the internal combustion engine is an Otto motor.

19. A method according to claim 1, wherein the internal combustion engine comprises a piston-swept volume of less than essentially 250 $cm^3$ per cylinder.

* * * * *